H. W. ADAMS.
TRACTION WHEEL.
APPLICATION FILED APR. 30, 1917.
1,333,055. Patented Mar. 9, 1920.
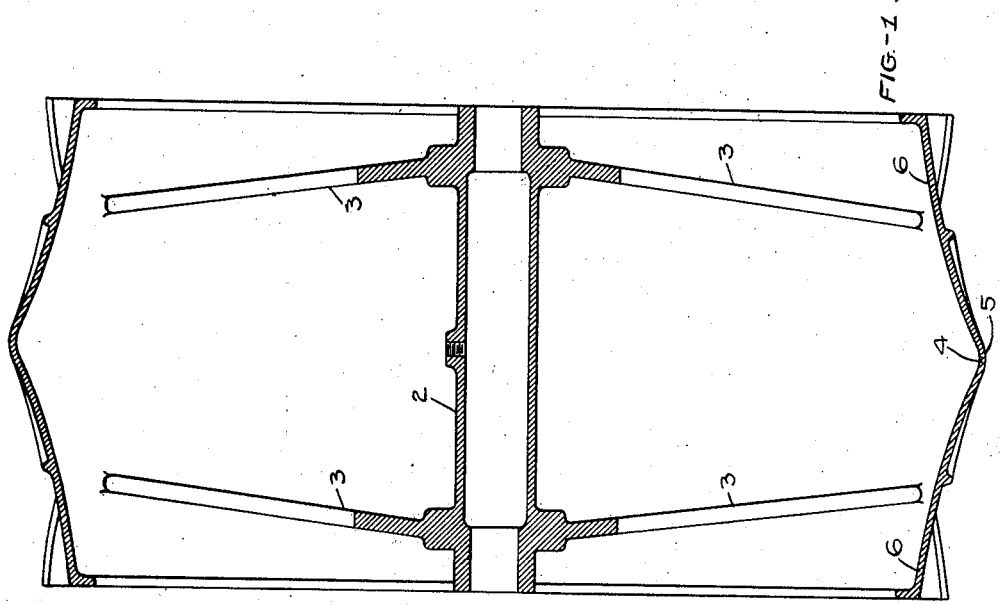
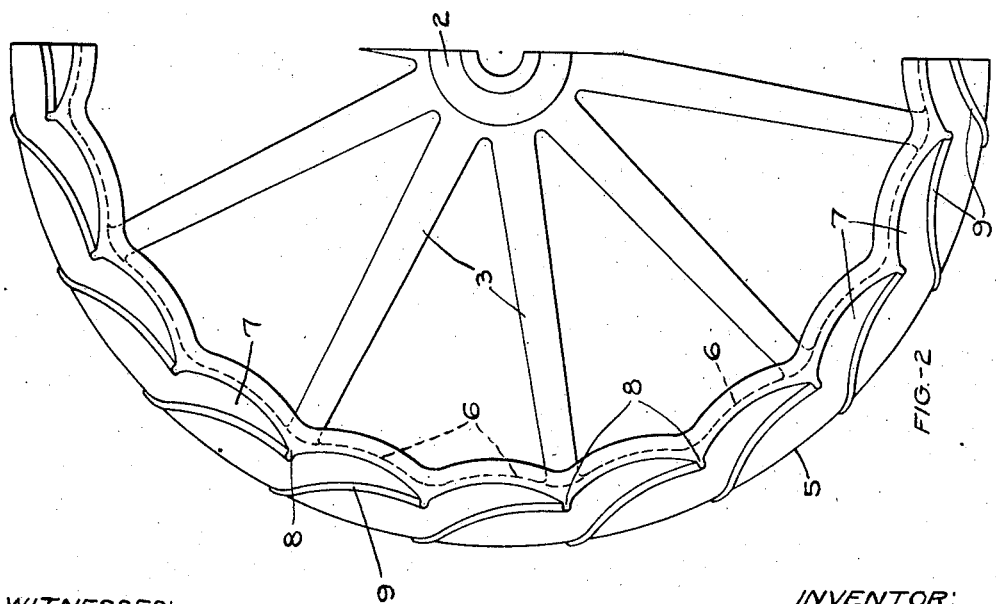
WITNESSES:
B. Hall.
E. A. Paul
INVENTOR:
HARRY W. ADAMS
BY
Paul & Paul
ATTORNEYS

UNITED STATES PATENT OFFICE.

HARRY W. ADAMS, OF MINNEAPOLIS, MINNESOTA.

TRACTION-WHEEL.

1,333,055.    Specification of Letters Patent.    Patented Mar. 9, 1920.

Application filed April 30, 1917. Serial No. 165,438.

*To all whom it may concern:*

Be it known that I, HARRY W. ADAMS, a citizen of the United States, resident of Minneapolis, county of Hennepin, State of Minnesota, have invented certain new and useful Improvements in Traction-Wheels, of which the following is a specification.

In the operation of a traction machine, considerable difficulty has been experienced in providing wheels suitable for all conditions of soil and use. A wheel that is adapted for use on soft ground and provided with the usual cleats or grippers obviously is wholly unsuited for running on a highway, as in moving the machine from place to place or for running on hard ground where a machine of this type is frequently used for traction purposes.

The object, therefore, of my invention is to provide a wheel having a rim of such construction that it will adapt itself to the varying conditions of the soil where the machine may be used or for running the machine from place to place on the highway.

The invention consists generally in various constructions and combinations, all as hereinafter described and particularly pointed out in the claim.

In the accompanying drawings forming part of this specification,

Figure 1 is a sectional view through a traction wheel embodying my invention,

Fig. 2 is a side elevation of a portion of the wheel.

In the drawing, 2 represents the wheel hub and 3 a series of spokes arranged in groups at each end of the hub and radiating therefrom to the rim. This rim is composed of a central raised portion 4 having an outer tread 5 on which the wheel rolls in traveling on hard ground, all other portions of the wheel, except possibly the ends of the ribs, being out of contact with the soil at such time. From this tread 5 the rim has sections 6 inclined inwardly toward the hub, the surface of such inclined sections being concave, as indicated at 7. Between these concave areas are raised portions 8 and extending from these raised portions diagonally across the concave areas toward the center of the wheel are ribs 9 which form cleats or grippers for digging into the soil and increasing the traction power of the wheel. These ribs gradually merge into the surface 5 and said surface will be substantially smooth and the wheel may roll easily thereon without bumping or jarring. As soon, however, as it strikes a piece of soft ground where greater traction is desired, the wheel will sink in and the inner portions of the ribs 9 will come in contact with the soil and as the ground over which the machine may be moving becomes softer and the wheel sinks to a greater depth, a greater portion of the ribs will be brought into engagement with the soil and the tractive power of the wheel correspondingly increased until such time as the entire width of the wheel rim is in engagement with the soil. I am thus able to adapt the wheel for all conditions of the soil without the necessity of mounting cleats thereon temporarily when it is desired to use the machine in soft soil, or removing them for running on a highway or the hard soil. The wheel in a sense automatically adapts itself for all the varying conditions of the ground over which it may be running. When the machine approaches a hard piece of ground the wheel will roll on the tread surface 5 at the center and the cleats or ribs will be substantially out of contact with the soil but upon striking soft ground again, the wheel will sink in and the cleats will again become operative.

In various ways the details of construction herein shown and described may be modified and still be within the scope of my invention.

I claim as my invention:

A traction wheel comprising a rim convex in cross section to form an annular tread surface at the center of the rim, said rim having diagonally arranged concave areas on both sides of said tread surface and ribs also extending diagonally on each side of said tread surface between said concave areas from the apex of said tread surface to the edges of the rim, said ribs gradually decreasing in depth from their outer toward their inner ends and coöperating with said concave areas to increase the wheel traction in soft ground, the outer portions of said ribs and said concave areas being out of contact with the soil when the wheel is running on hard ground.

In witness whereof I have hereunto set my hand this 18th day of April, 1917.

HARRY W. ADAMS.